United States Patent
Tsujino et al.

(10) Patent No.: US 7,702,402 B2
(45) Date of Patent: Apr. 20, 2010

(54) FUNCTION CONTROL METHOD, AND TERMINAL DEVICE

(75) Inventors: Daisuke Tsujino, Tokyo (JP); Hirohisa Kusuda, Tokyo (JP); Yasuhiro Nishide, Tokyo (JP); Jun Yamazaki, Tokyo (JP)

(73) Assignee: Vodafone K.K., Tokyo (JP)

( * ) Notice: Subject to any disclaimer, the term of this patent is extended or adjusted under 35 U.S.C. 154(b) by 24 days.

(21) Appl. No.: 11/785,735

(22) Filed: Apr. 19, 2007

(65) Prior Publication Data

US 2007/0282468 A1 Dec. 6, 2007

Related U.S. Application Data

(63) Continuation of application No. PCT/JP2005/019180, filed on Oct. 19, 2005.

(30) Foreign Application Priority Data

Oct. 19, 2004 (JP) .............................. 2004-303920

(51) Int. Cl.
*G06F 19/00* (2006.01)
(52) U.S. Cl. ...................... 700/83; 702/123; 345/184
(58) Field of Classification Search .................. 700/83, 700/90, 76, 122, 29, 7, 56; 702/123, 173, 702/122, 177, 119; 345/184, 355, 169; 348/14.15, 348/199; 455/550.1, 566
See application file for complete search history.

(56) References Cited

U.S. PATENT DOCUMENTS

| | | | | |
|---|---|---|---|---|
| 5,202,957 A | * | 4/1993 | Serrao ...................... 348/14.15 |
| 6,487,421 B2 | * | 11/2002 | Hess et al. ................ 455/550.1 |
| 6,850,252 B1 | * | 2/2005 | Hoffberg .................... 715/716 |
| 6,912,386 B1 | * | 6/2005 | Himberg et al. ............. 455/423 |
| 6,934,777 B2 | * | 8/2005 | Kawamura et al. ............ 710/62 |
| 7,562,459 B2 | * | 7/2009 | Fourquin et al. ......... 33/366.11 |
| 7,580,572 B2 | * | 8/2009 | Bang et al. .................. 382/186 |
| 2004/0066970 A1 | * | 4/2004 | Matsugu ..................... 382/217 |

FOREIGN PATENT DOCUMENTS

| | | |
|---|---|---|
| CN | 1259836 A | 7/2000 |
| GB | 2 347 593 A | 9/2000 |
| GB | 2 357 673 A | 6/2001 |
| JP | 10-240434 | 9/1998 |
| JP | 2000-214988 | 8/2000 |

* cited by examiner

*Primary Examiner*—Kidest Bahta
(74) *Attorney, Agent, or Firm*—Kratz, Quintos & Hanson, LLP

(57) ABSTRACT

When, from a standby screen of a terminal device, a user depresses a motion key (S11) and performs a registered movement (S13), a sensor unit observes the movement of the terminal device, and a movement parameter calculation unit calculates a movement parameter. A movement parameter change decision unit decides (S15 and S16) whether or not a change of the movement parameter which is calculated, and a change of the movement parameter corresponding to a predetermined function registered in advance, agrees with one another. If the result of this decision is affirmative, a function control unit starts the corresponding function (S17). As a result, it is possible to set the terminal device to a state in which the predetermined function can be employed, with a simple and easily remembered actuation.

8 Claims, 12 Drawing Sheets

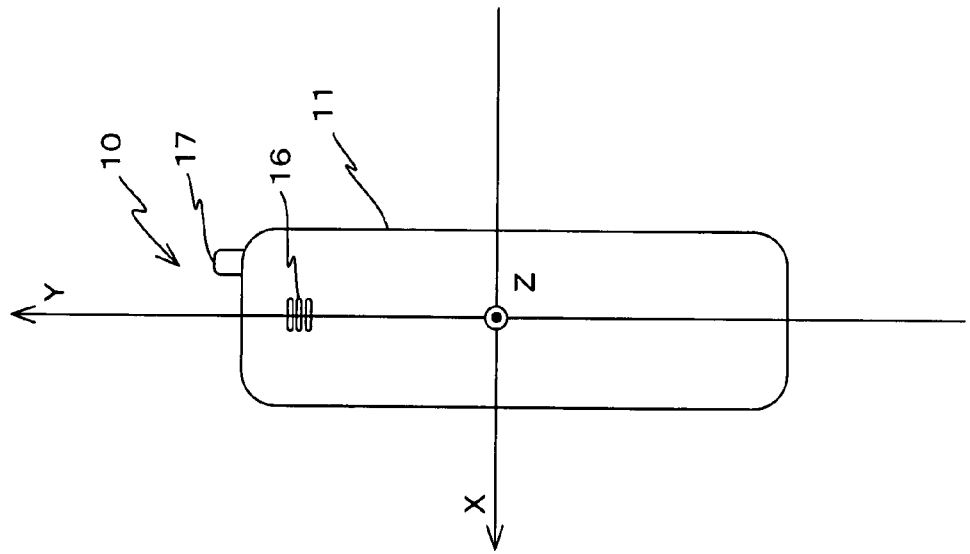
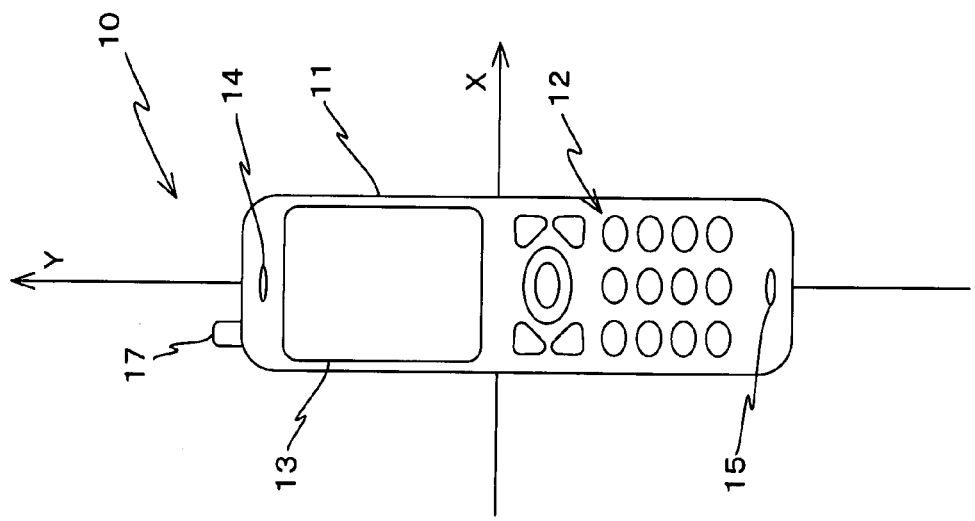

FUNCTION CONTROL METHOD, AND TERMINAL DEVICE

RELATED APPLICATION

This is a continuation application of the international patent application No. PCT/JP2005/019180 filed with Application date: Oct. 19, 2005. The present application is based on, and claims priority from, J.P. Application 2004-303920, filed on Oct. 19, 2004, the disclosure of which is hereby incorporated by reference herein its entirety.

BACKGROUND OF THE INVENTION

The present invention relates to a function control method and to a terminal device, and more particularly relates to a function control method which sets a function to a state in which it can be utilized, and to a terminal device which employs this method.

BACKGROUND ART

From the past various kinds of terminal device have become widespread, such as, for example, mobile communication terminal devices. In recent years, the functions of these terminal devices have become more complex and more numerous, so that they are becoming extremely convenient, from the point of view of a user who is able to exploit these multiple functions. On the other hand, from the point of view of a user who only utilizes the function of one portion of such a terminal device, or of a person who is a novice in the use of a terminal device, often their operation becomes complicated, and he may not remember the entire procedure. As a countermeasure against these problems, with almost all mobile communication terminal devices, it is made possible to use short cut keys, so that an abbreviated method of accessing certain functions is provided.

Furthermore, in recent years, information of high secrecy, such as email containing industrial secrets or the like, is often stored upon a terminal device, not only directed to a friend or to the workplace, but to other destinations. Moreover, there are also terminals which cannot be actuated if it has not been confirmed that the operator is the proper person to do so, via authentication by a password or a fingerprint or the like; and accordingly this information cannot be accessed in a simple manner if the terminal device upon which this type of high secrecy information is stored should be misplaced or stolen.

SUMMARY OF THE INVENTION

As described above, with a multi-function terminal device, although countermeasures such as setting of short cut keys and the like may be implemented so that a user may utilize only a portion of the functions, along with terminal devices being made more compact, the keys themselves become smaller, and many people oppose resistance to operation of such small keys. Moreover, since normally a plurality of functions are allocated to a single key, accordingly it is necessary to remember the key strokes for endowing this key with the functions of a short cut key.

Furthermore, with the above described type of authentication by password, the number of keystrokes until the user finally reaches the desired information becomes large, and, due to this, in daily use, it often happens that the user cancels the password, which is undesirable; so that this is not a very practical solution. Moreover, with the method of authentication of the user as the proper operator by a fingerprint or the like, it becomes necessary to provide dedicated hardware and the like which is used only for fingerprint authentication, and this is undesirable because it imposes a high cost burden upon the user.

The present invention has been conceived in consideration of the circumstances described above, and its object is to provide a function control method and a terminal device which can establish a state in which it is possible to utilize a predetermined function with a simple and easily remembered operation.

A first aspect of the present invention is a function control method for controlling the function of a terminal device, comprising: a movement parameter calculation process of calculating the value of a movement parameter of said terminal device, based upon a value detected by a sensor which detects a state of movement of said terminal device; a movement parameter change decision process of deciding whether or not the value of the movement parameter calculated by said movement parameter calculation process is undergoing a predetermined temporal change; and a function setting process of, if an affirmative decision is reached in said movement parameter change decision process, setting a predetermined function which corresponds to said predetermined temporal change to a state in which it can be utilized.

With this function control method, first, in the movement parameter calculation process, the value of the movement parameter of the terminal device is calculated based upon the value detected by the sensor which detects the movement state of the terminal device. Next, in the movement parameter change decision process, a decision is taken as to whether or not the value of the movement parameter which has been calculated has undergone the predetermined temporal change. If the result of the decision in this movement parameter change decision process is affirmative, a state is established in which it is possible to utilize the predetermined function which corresponds to the predetermined temporal change. Accordingly, since it is possible to set the state in which the predetermined function can be utilized according to the state of movement of the terminal device, it is possible to establish the state in which the predetermined function can be utilized with a simple and easily remembered actuation.

With the function control method of the present invention, the movement parameter may be parameters including an acceleration and an attitude angle of said terminal device. In this case, by making the movement parameters be the acceleration and the attitude angle of the terminal device, it is possible to ascertain the state of movement of the terminal device in an accurate manner.

Furthermore, with the function control method of the present invention, the predetermined temporal change may be determined by combining at least one of movements which are determined in advance. In this case, for example, by combining simple shifts in the right direction, the left direction, and the like, and by making this combination correspond to a predetermined function, it is possible to establish a state in which the predetermined function can be used with a simple and easily remembered actuation.

Furthermore, with the function control method of the present invention, the predetermined temporal change may be acquired by movement of terminal device. In this case, it is possible for the user to set the predetermined temporal change of the movement parameter by moving the terminal device in the desired mode.

Furthermore, with the function control method of the present invention, the predetermined function may be made to be a function which can be set to a state in which it can be used, by command input from an operation unit of terminal device. In this case, by setting a function which is difficult to utilize by actuation of the operation unit as the predetermined function, it is possible to utilize the predetermined temporal change of the value of the movement parameter as a so called short cut.

Here, it may be arranged for a command input for releasing security to be included in the command input from the operation unit. In this case, for a function for which actuation to release security by input of a password or the like is required as well, it is possible to establish a state in which the predetermined function can be utilized with a simple and easily remembered actuation set by the user, and without any complicated actuation for such release.

And the terminal device of the present invention is a terminal device, comprising: a sensor unit which acquires information necessary for calculating the value of a movement parameter; a movement parameter calculation unit which calculates a value of the movement parameter from the value detected by said sensor unit; a movement parameter change decision unit which decides whether or not a change of the value of said movement parameter which has been calculated is undergoing a predetermined temporal change; and a function control unit which, if an affirmative decision is reached by said movement parameter change decision unit, sets a predetermined function which corresponds to said predetermined temporal change to a state in which it can be utilized.

With this terminal device, the sensor unit such as an accelerometer or a magnetometer or the like acquires the necessary information for calculation of the value of the movement parameter. Here, the movement parameter means velocity, acceleration, attitude angle and the like, and is a variable which specifies the movement state of the terminal, including its stationary state. The movement parameter calculation unit calculates this movement parameter from the information which has been acquired by the sensor unit. A decision is made by the movement parameter change decision unit as to whether or not this movement parameter which has been calculated is undergoing the predetermined temporal change. If the decision by the movement parameter change decision unit is affirmative, in other words if it has been decided that the predetermined temporal change is being undergone, the function control unit establishes the state in which the predetermined function can be used.

In other words, the terminal device of the present invention may utilize the function control method of the present invention, described above. Thus, according to the terminal device of the present invention, it is possible to establish the state in which the predetermined function can be utilized, with a simple and easily remembered actuation.

With the terminal device of the present invention, along with an operation unit being further comprised, said predetermined function may be made to be a function which can be set to a state in which it can be used by command input from said operation unit. In this case, as the predetermined function, a function for which a large number of actuations from the operation unit are required in order to make utilization possible, it is possible to utilize generation of the predetermined temporal change of the value of the movement parameter for designating a so called short cut. Accordingly, without any complicated actuation, it is possible to establish a state in which it is possible to utilize the predetermined function, with a simple and easily remembered actuation which is set by the user.

Furthermore, the terminal device of the present invention may further comprise a wireless communication unit for communicating with a base station of a mobile communication net. In other words, the terminal device of the present invention may be used as a mobile communication terminal device such as a cellular phone or the like.

As has been explained above, according to the function control method and the terminal device of the present invention, the user experiences the beneficial effect that he is able, with a simple and easily remembered operation, to establish a state in which he is able to utilize a predetermined function.

BRIEF DESCRIPTION OF DRAWINGS

FIG. 1A is a figure schematically showing the external appearance and structure of a cellular phone according to a first embodiment of the present invention as seen from its front side;

FIG. 1B is a figure schematically showing the external appearance and structure of this cellular phone according to the first embodiment of the present invention as seen from its rear side;

DETAILED DESCRIPTION

Embodiment One

Figure 2:
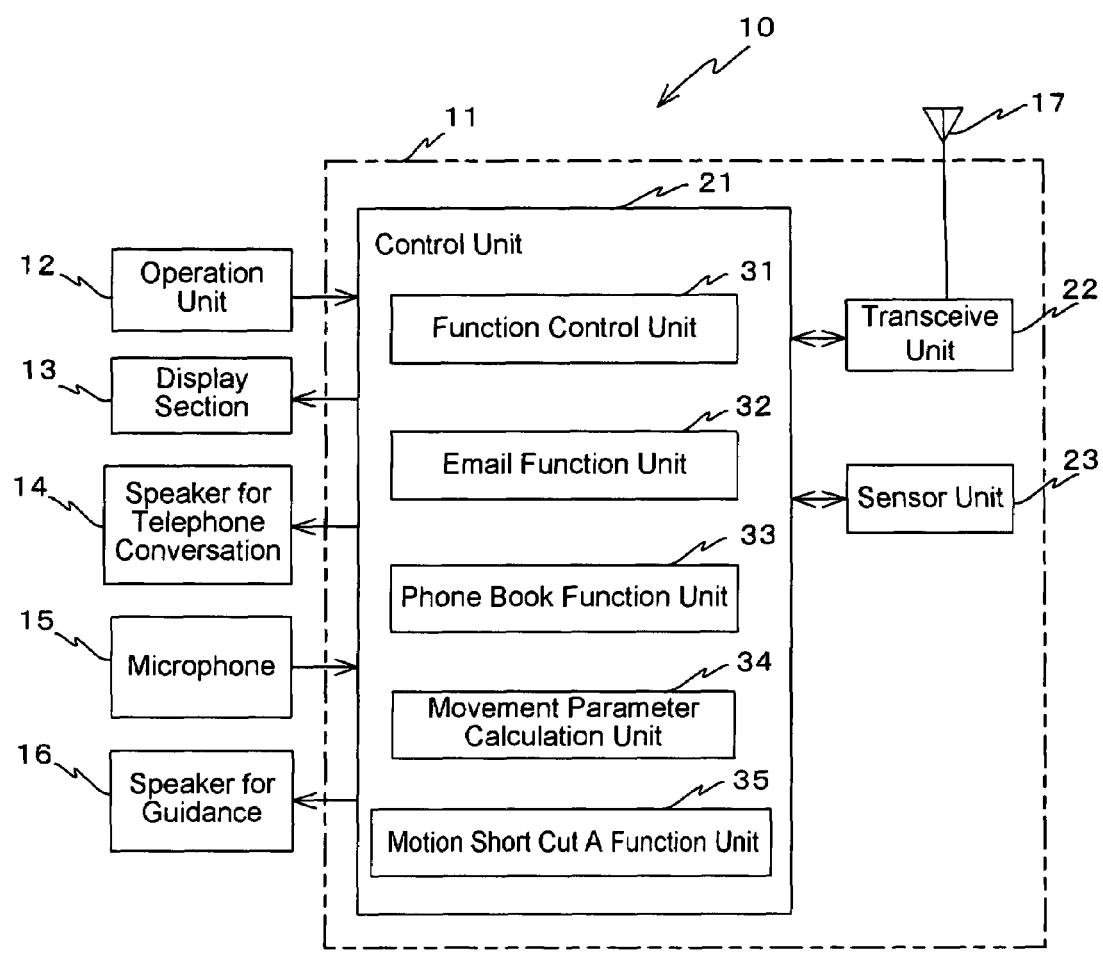
FIG. 2 is a block diagram for explanation of the internal structure of the cellular phone shown in FIGS. 1A and 1B.

In the following, a first embodiment of the present invention will be explained with reference to FIGS. 1A through 6.

In FIG. 1A, an elevation view of the cellular phone 10 according to the first embodiment of the present invention is shown, and in FIG. 1B a rear view of this cellular phone 10 is shown. As generally shown in FIGS. 1A and 1B, this cellular phone 10 comprises (a) a cellular phone main body 11; (b) an operation unit 12 comprising a ten key pad for inputting telephone numbers, function keys for inputting various types of command such as changing over between operational modes, and so on; (c) a display section 13 comprising a liquid crystal display device which displays operational guidance, operational states, received messages and the like; (d) a speaker for telephone conversation 14 which replays voice signals which have been sent from an opposite party to communication during a telephone conversation and have arrived; (e) a microphone 15 for inputting sound during capture, and for inputting voice during a telephone conversation; (f) a speaker for guidance 16 for generating ring tones and guidance sounds; and (g) an antenna 17 for transfer of wireless signals to and from a base station.

It should be understood that it is supposed that, upon this cellular phone 10, an coordinate system intrinsic to the cellular phone 10 is defined by, in the rear view of FIG. 1B, establishing an X axis in the leftwards direction, a Y axis in the upwards direction, and a Z axis from the rear of the drawing paper towards its front side.

As shown in FIG. 2, in the interior of the cellular phone main body 11, there are provided (h) a control unit 21 which controls the overall operation of the cellular phone 10 as a whole; (i) a transceive unit 22 which performs wireless communication via the antenna 17; and (j) a sensor unit 23 comprising two accelerometers in the X axis direction and the Y axis direction, and magnetometers in the X axis direction, the Y axis direction, and the Z axis direction.

Here, the control unit 21 comprises (i) a function control unit 31 which controls the starting of the functions of the cellular phone 10; (ii) an email function unit 32, which is an application having an email function; (iii) a phone book function unit 33, which is a phone book application; (iv) a movement parameter calculation unit 34, which acquires the values which have been observed by the various sensors of the sensor unit 23, and calculates movement parameters, i.e. the accelerations in the X axis direction and the Y axis direction and the attitude angles around the X axis and around the Y axis (hereinafter respectively termed the "roll angle" and the "pitch angle"); and (v) a motion short cut A function unit 35 which decides which two movements have been performed in succession, among movements upwards, downwards, leftwards, and rightwards which will be described hereinafter, and which extracts a function which corresponds to these two successive movements.

It should be understood that, in this embodiment, the control unit 21 comprises a central processing unit (CPU), a digital signal processor (DSP), and non-volatile and volatile storage devices and the like, and is arranged to perform operational control of the functions described above. Here, the function control unit 31, the email function unit 32, the phone book function unit 33, the movement parameter calculation unit 34, and the motion short cut A function unit 35 are constituted by programs which are executed by the control unit 21.

Figure 3:
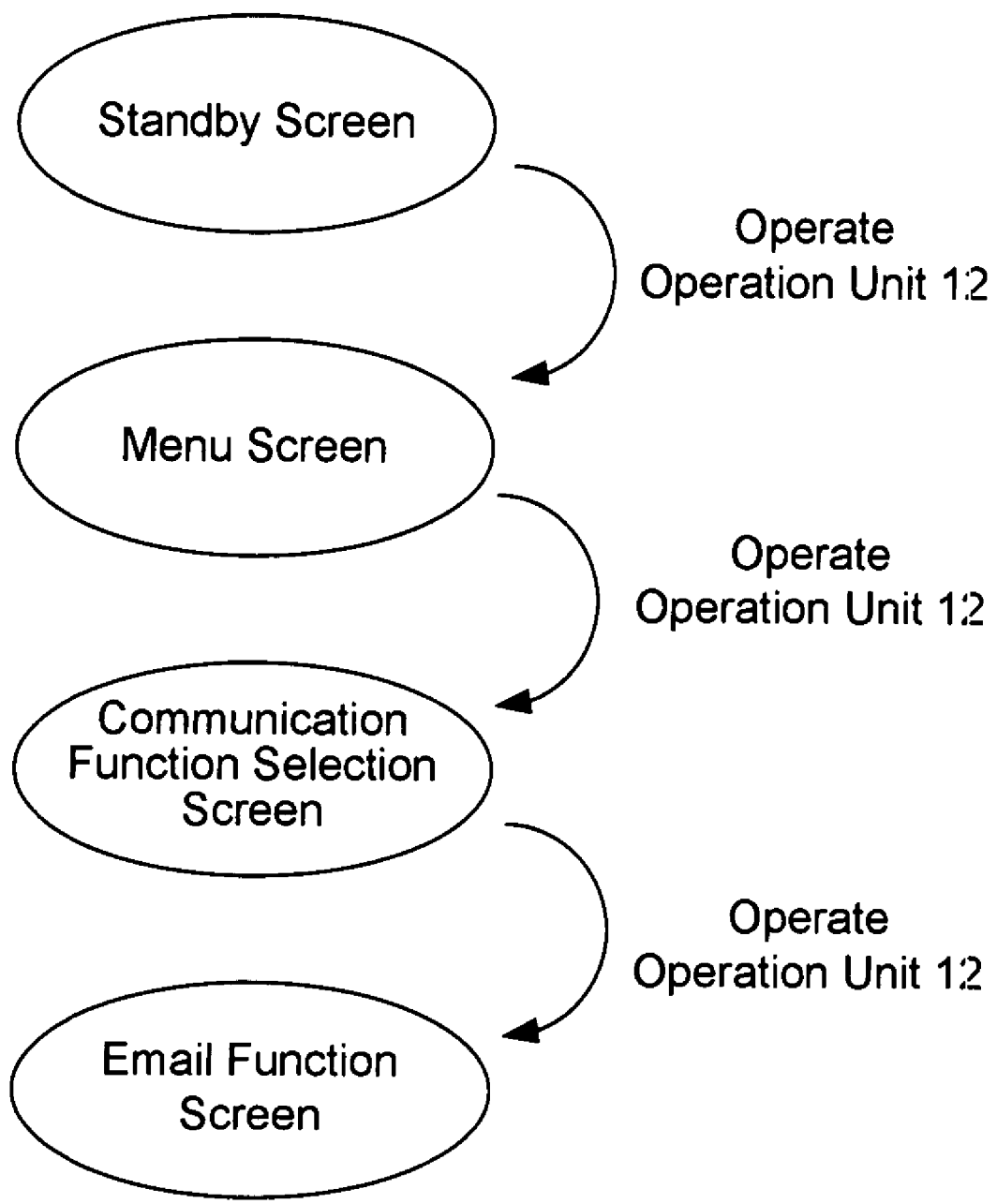
FIG. 3 is a figure illustrating transitions to an email function setting screen when an operation unit of the cellular phone of FIG. 1A is actuated.

Furthermore, with this cellular phone 10, as shown in FIG. 3, in order for the email function to be started by actuation of the operation unit 12, it is necessary to transition sequentially through the display of three screens: from the standby screen, via the menu screen and the communication function selection screen, to the email function screen.

Figure 4:
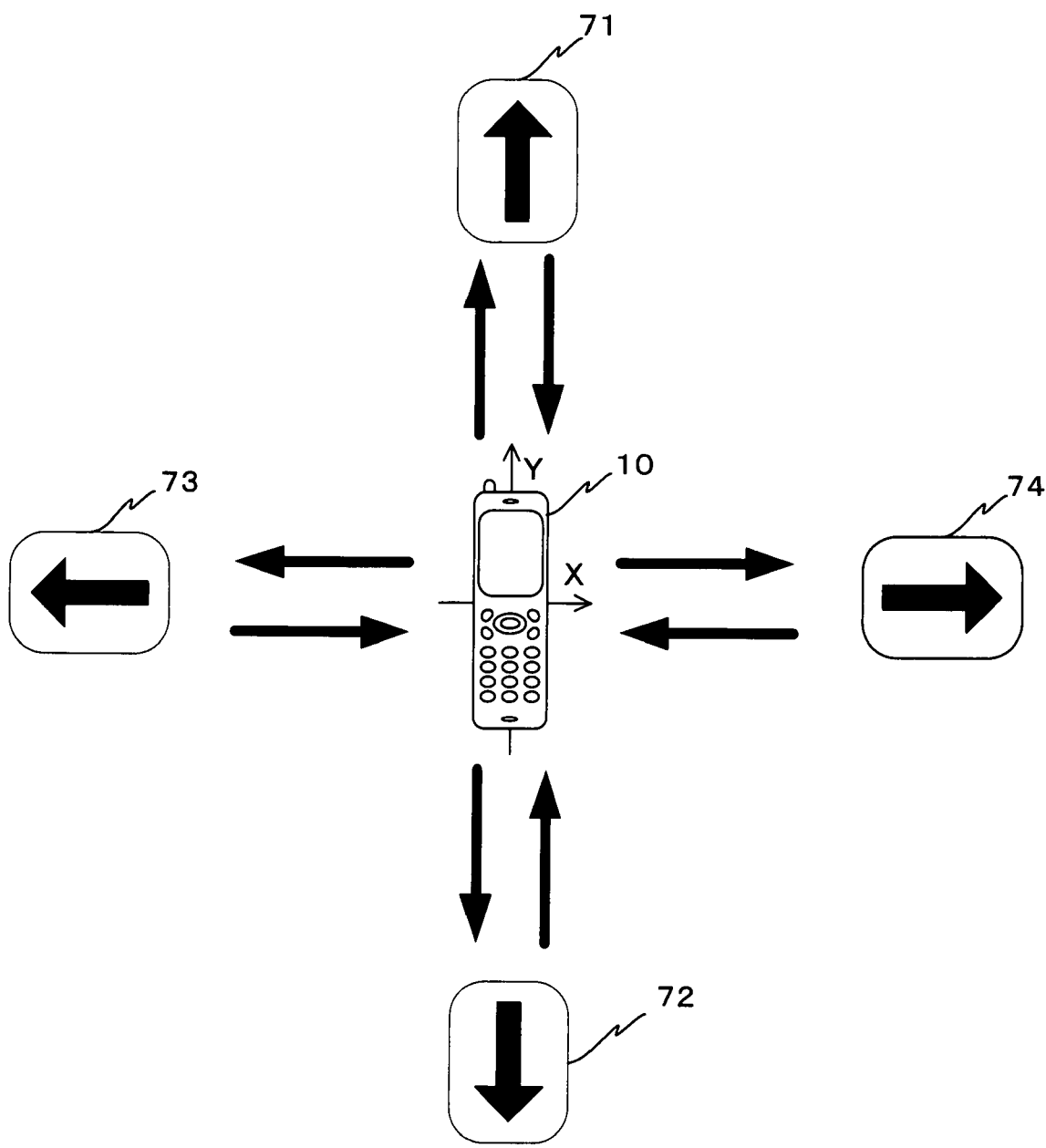
FIG. 4 is a figure schematically showing basic movements of a motion short cut A function of the cellular phone shown in FIGS. 1A and 1B.

Next, a function control method will be explained for this cellular phone 10 having a structure as described above, in which the motion short cut A function for shifting to the email function screen is used. Here, in this embodiment, as shown in FIG. 4, the +Y direction, the −Y direction, the −X direction, and the +X direction will respectively be taken as being the upwards, downwards, leftwards, and rightwards directions. And the four types of movements consisting of shifting towards any one of the upwards, downwards, leftwards, and rightwards directions and then returning to the original position, will be taken as being the basic movements in the motion short cut A function. In the following, these four types of movements will be referred to as "upwards", "downwards", "leftwards", and "rightwards", and, in the drawing, they will be denoted by the arrow signs 71 through 74. And the convention will be that two such movements of the cellular phone 10 in succession, for example when a "downwards" movement is performed after an "upwards" movement, will be expressed as "upwards—downwards", and in the drawing they will be shown by the arrow signs 71 and 72 being written in that order from the left.

Figure 5:
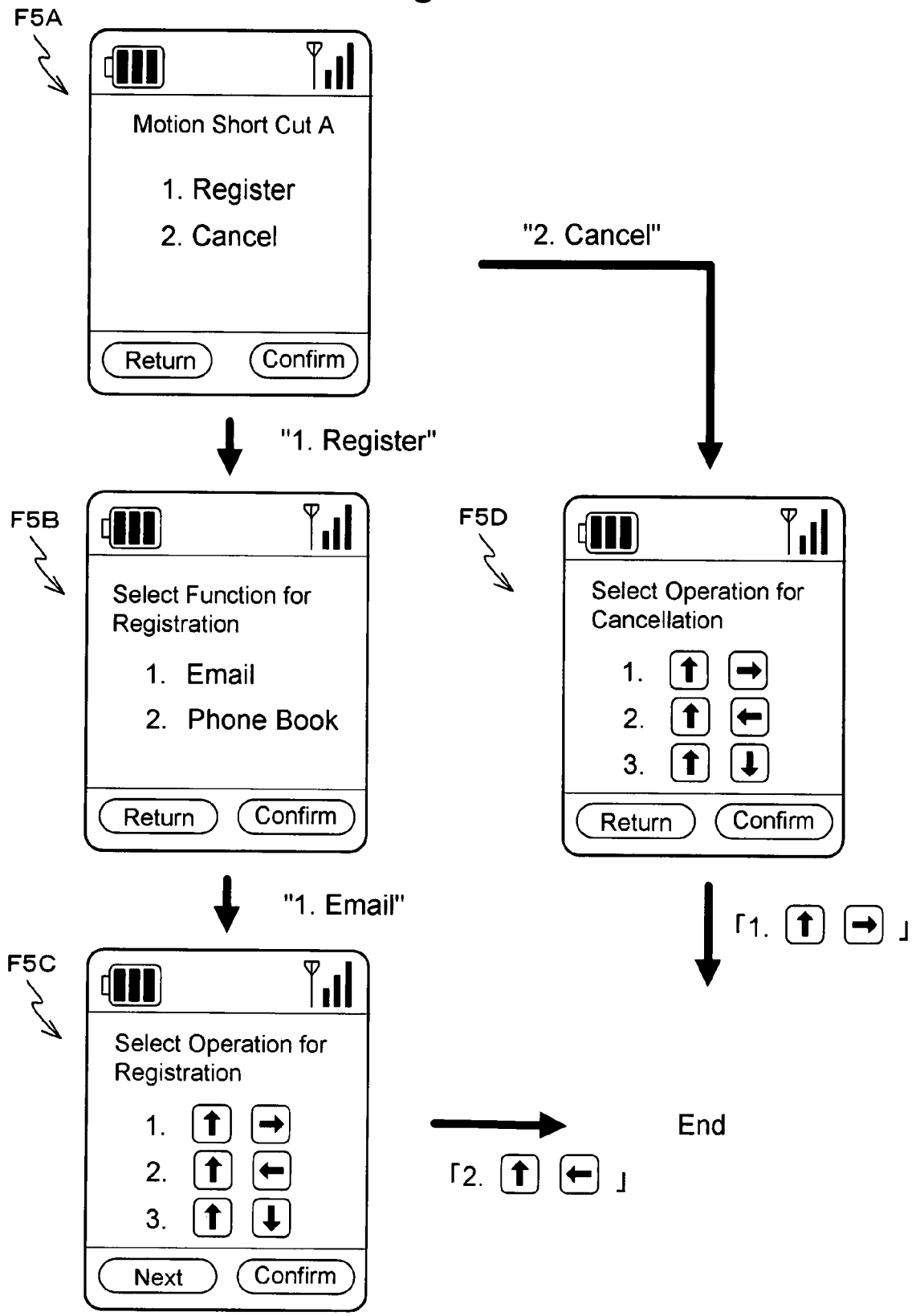
FIG. 5 is a screen transition figure, schematically showing the method for registering this motion short cut A function.

First, the case of registering the email function screen as a short cut destination for the motion short cut A function will be explained while referring to the transition of the screen display on the display section 13 shown in FIG. 5. Initially, the user starts the motion short cut A function unit 35 by actuating the operation unit 12, and displays the screen F5A. When, in order for the user to register a short cut on this screen, he actuates the operation unit 12 and selects the field "1. Register", the screen F5B for selecting the function which is to be employed as a short cut is displayed.

Next, when the user selects the field "1. Email" which is the function to be used as the short cut, the screen F5C is displayed for selecting the movement of the cellular phone 10 for starting the email function unit 32. Here, when the user selects the field "2. upwards—leftwards", then the movement "upwards"—"leftwards" is allocated as the motion short cut A function for starting the email function, and the movement "upwards—leftwards" is registered within the motion short cut A function unit 35 in correspondence with the email function.

Furthermore, if during the display of the screen F5A the user selects the field "2. Cancel", then the screen F5D for canceling the registration of a function corresponding to a movement is displayed. Here, if the user selects the field "1. upwards—rightwards", then the registration of the function which corresponds to the movement "upwards"—"rightwards" is canceled.

Figure 6:
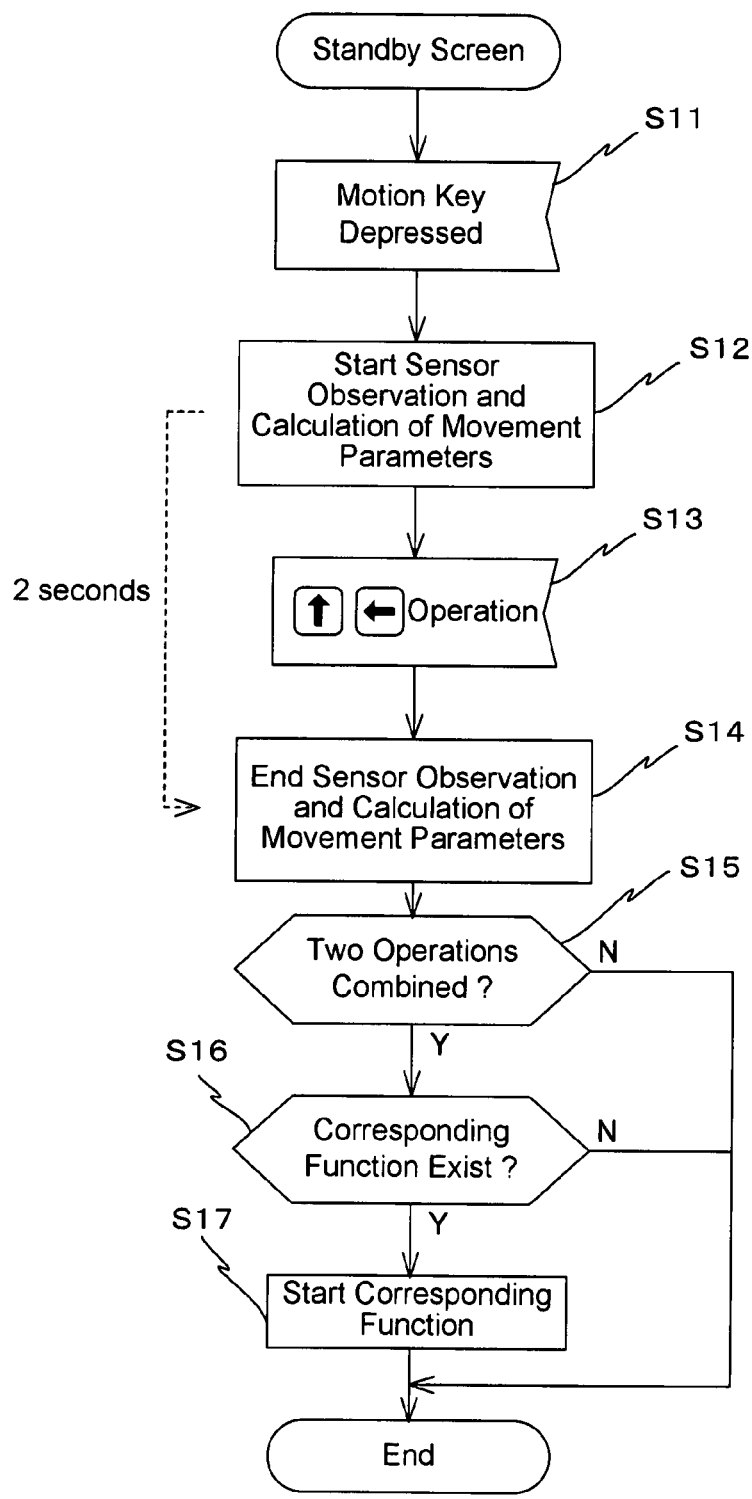
FIG. 6 is a flow chart, schematically showing the flow of usage of this motion short cut A function.

Next, the method of employing the motion short cut A function unit 35 in which a registration has been made will be explained with reference to FIG. 6. First in a step S11, when, on the standby screen of the cellular phone 10, the user presses a motion key which is present upon the operation unit 12, the flow of control proceeds to the step S12. In this step S12, upon receipt of notification of this depression of the motion key, the motion short cut A function unit 35 of the control unit 21 commands the sensor unit 23 to start observation, and the sensor unit 23 starts its observation. In parallel therewith, the movement parameter calculation unit 34 starts acquisitions of the data which have been observed, and starts calculation of the movement parameters from the observed values of the accelerations along the X axis and the Y axis, and of the magnetic fields along the X axis, the Y axis, and the Z axis.

Next, in a step S13, the user performs, with the cellular phone 10, the movement "upwards"—"leftwards" which has been registered therein. This movement "upwards"—"leftwards" by the user is observed by the sensor unit 23 as a movement of the cellular phone 10, and the movement parameter calculation unit 34 calculates movement parameters based upon these values which have been observed. The observation which was started in the step S12 is terminated in a step S14 after 2 seconds, and the calculation processing for the movement parameters by the movement parameter calculation unit 34 is also terminated when the data observed by the sensor unit 23 ceases to be provided.

The motion short cut A function unit 35 acquires the movement parameters which have been calculated by the movement parameter calculation unit 34, and, in a step S15, decides upon the combination of two successive movements which has been employed, from among the various upwards, downwards, leftwards, and rightwards movements described above. Here, if it is not possible to decide upon any combination of two successive movements, a display is performed upon the display section 13 to the effect that it is not possible to decide upon any combination of movements, and the processing is terminated.

If a combination of two successive movements has been decided upon, in a step S16, the motion short cut A function unit 35 searches for whether or not a function is registered corresponding to "upwards"—"leftwards". Upon confirmation that the email function is registered in correspondence with "upwards"—"leftwards", the motion short cut A function unit 35 commands the function control unit 31 to start the email function. Here, if a corresponding function has not been confirmed, the processing is terminated. And, upon being commanded to start the email function, the function control unit 31 starts the email function in a step S17.

As has been explained above, in this embodiment, first, among certain movements of this cellular phone 10 which are determined in advance, a combination of two thereof, and the function which it is desired to start thereby as a short cut, are selected, and this pair is registered as a motion short cut. Next, from the standby screen of the cellular phone 10, the user presses the motion key upon the operation unit 12, and, when he performs the movement which is registered with the cellular phone 10, the sensor unit 23 observes this movement of the cellular phone 10, and the movement parameter calculation unit 34 calculates the movement parameters based upon these values which have been observed.

Next, the motion short cut A function unit 35 decides upon the combination of two movements which has been employed from the movement parameters which have been calculated, and searches whether a function which corresponds to this combination of two movements is registered. If a function which corresponds to this combination of two movements is registered, then the function control unit 31 is commanded to start this function, and the function control unit 31 starts this function.

Thus since, according to this first embodiment, a function which is registered is started with a simple combination of movements of the cellular phone 10 in the rightwards direction, the leftwards direction, or the like, accordingly it is possible to set the state in which it is possible to employ a predetermined function, with a simple and easily remembered operation. Furthermore, it is possible to ascertain the movement state of the cellular phone 10 by using accelerations and attitude angles as the movement parameters. Moreover, since a registered function is a function which can also be started by actuating the operation unit, it can also be utilized as a so called short cut function.

It should be understood that, in this first embodiment, it is arranged to perform a short cut transition to the screen display for the email function, which is displayed by actuation without any password input being included. By contrast, it would also be acceptable to arrange to perform a short cut transition to screen display of a function which makes it necessary to perform some operation including input of security information, such as password input or the like.

Furthermore although, in this first embodiment, it was the starting of the email function which was made to be accessed by the motion short cut A function, of course it would be possible to make starting of some function other than the email function be accessed by the motion short cut A function.

Furthermore although, in this first embodiment, it was arranged to start observation by the sensor unit 23 according to depression of the motion key, it would also be acceptable to arrange for the sensor unit 23 always to perform continuous observation.

Furthermore although, in this first embodiment, movements related to the four directions upwards, downwards, leftwards, and rightwards were taken as the basic movements, of course it would also be acceptable to arrange for movements in some other directions, or rotational movements, to be taken as the basic movements.

Furthermore, in this first embodiment, the movements which were taken advantage of for the motion short cut A function were combinations of two of the basic movements. By contrast, it would also be acceptable to arrange to utilize individual basic movements as the movements taken advantage of for the motion short cut A function, or combinations of three or more of the basic movements.

Furthermore although, in this first embodiment, the time period over which the movement of the cellular phone 10 was observed was taken as being two seconds, of course it would also be acceptable to arrange for this time period to be some time period other than two seconds.

Embodiment Two

In the following, a second embodiment of the present invention will be explained with reference to FIGS. 7A through 12B. Here, to elements which are the same as, or equivalent to, ones in the first embodiment, the same reference symbols are affixed, and duplicated explanation thereof is omitted.

Figure 7B:
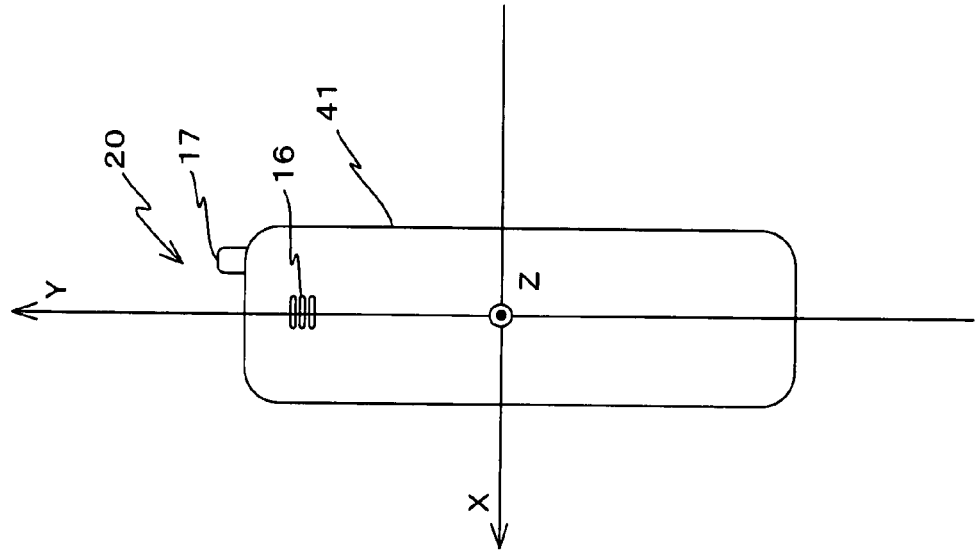
FIG. 7B is a figure schematically showing the external appearance and structure of this cellular phone according to the second embodiment of the present invention as seen from its rear side.
Figure 7A:
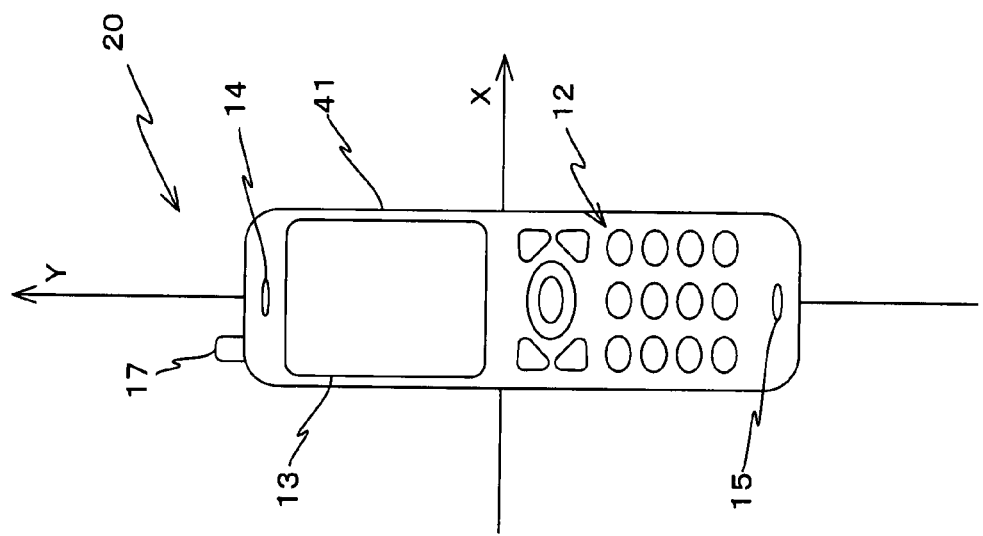
FIG. 7A is a figure schematically showing the external appearance and structure of a cellular phone according to the second embodiment of the present invention as seen from its front side.

FIGS. 7A and 7B show the external appearance and structure of a cellular phone 20 according to the second embodiment of the present invention. The external appearance of this cellular phone 20 is the same as that of the cellular phone 10 according to the first embodiment shown in FIGS. 1A and 1B described above, with the exception of the feature that, instead of the cellular phone main body 1, cellular phone main body 41 is incorporated; and the same coordinate axes are also the same as in the case of the first embodiment.

Figure 8:
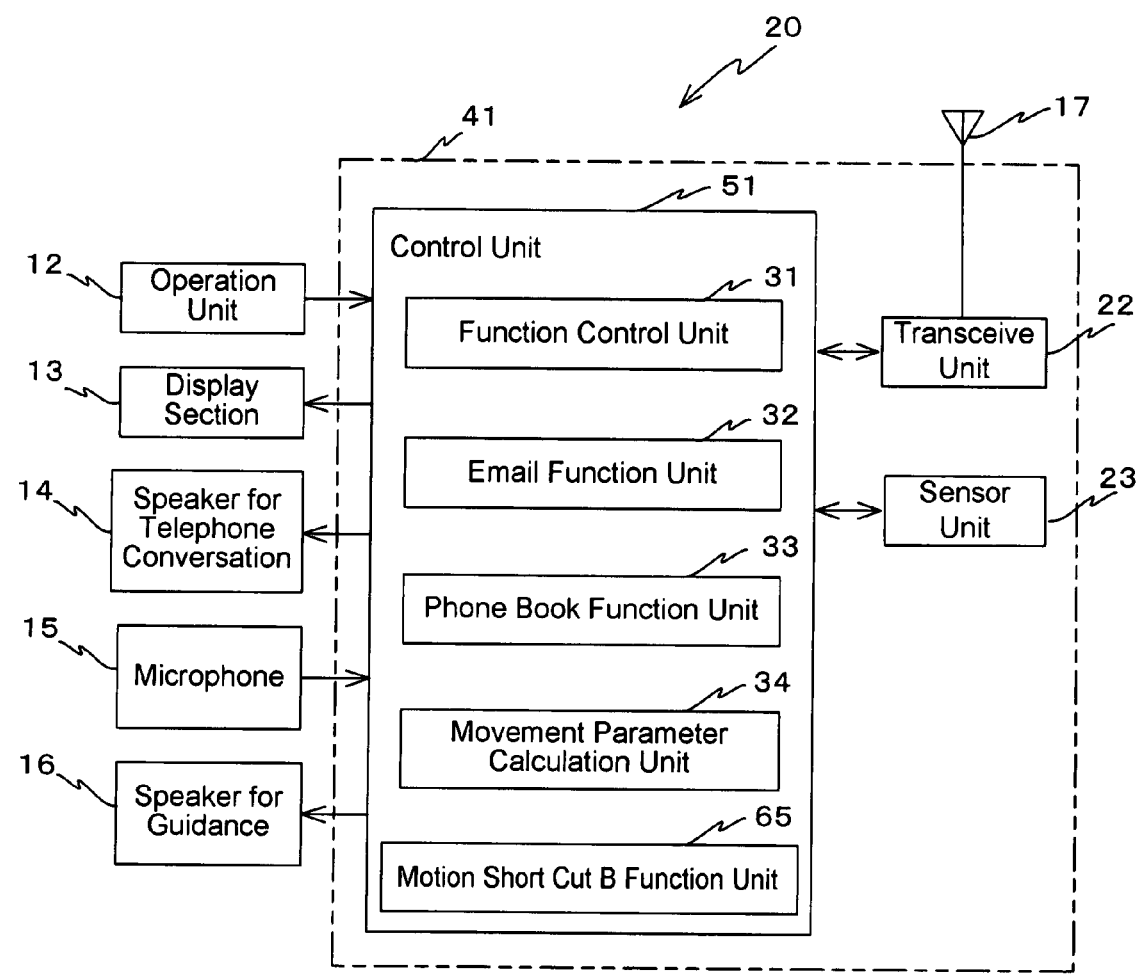
FIG. 8 is a figure schematically showing the internal structure of the cellular phone shown in FIGS. 7A and 7B.

As shown in FIG. 8, the interior of the cellular phone main body 41 of this cellular phone 20 is the same as compared to that of the cellular phone 10 according to the first embodiment described above, except for the feature that, instead of the motion short cut A function unit 35, a motion short cut B function unit 65 is incorporated. Based upon changes of movement parameters calculated by a movement parameter calculation unit 34, this motion short cut B function unit 65 extracts a function which is registered in correspondence with these changes.

It should be understood that, in this embodiment, in the same manner as in the case of the first embodiment, the control unit 51 comprises a control unit 51, a central processing unit (CPU), a digital signal processor (DSP), non-volatile and volatile storage devices, and the like; and a function control unit 31, an email function control unit 32, a phone book function unit 33, the movement parameter calculation unit 34, and the motion short cut B function unit 65 are constituted as programs which are executed by the control unit 51.

Figure 9:
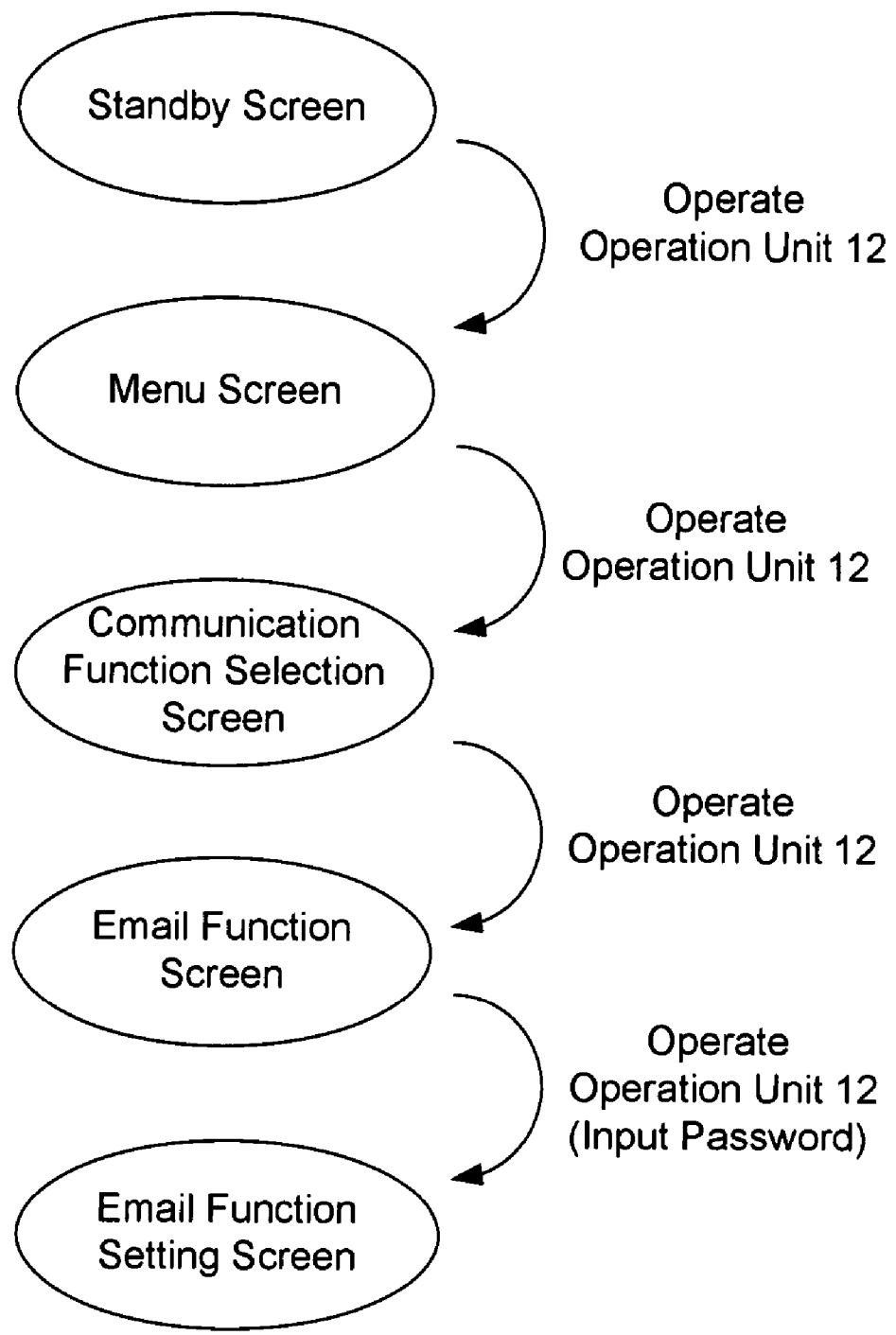
FIG. 9 is a figure illustrating transitions to an email function setting screen when an operation unit of the cellular phone of FIG. 7A is actuated.
Figure 10:
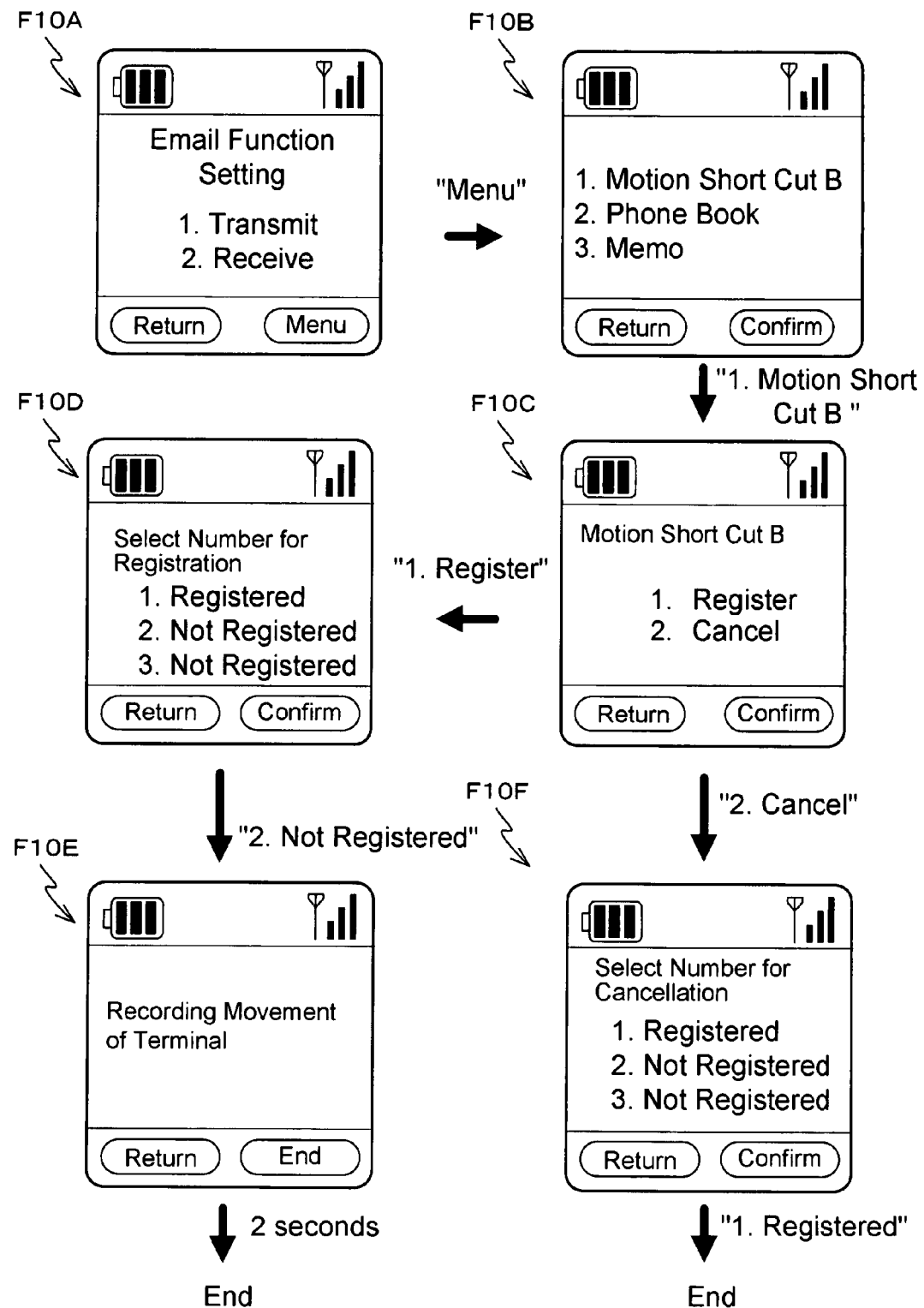
FIG. 10 is a screen transition figure, schematically showing the method for registering this motion short cut B function.

Furthermore, with this cellular phone 20, in order to transit from the standby screen to email function setting screen, as shown in FIG. 9, it is necessary to transit the display screen through a menu screen, a communication function selection screen, and an email function screen, and, after inputting a password, to transit to the email function setting screen.

Next, the function control method for this cellular phone 20 having the structure described above, in the case of using the motion short cut B function, will be explained.

First, with this cellular phone 20, as shown in FIG. 9, in order to register the email function setting screen as a short cut destination for the motion short cut B function, by actuation of the operation unit 12, the user displays the email function setting screen, which is to be registered as the screen to be the destination of transition by a short cut, from the standby screen via the menu screen, the communication function selection screen and the email function screen. It should be understood that, when transiting to the email function setting screen, the input of a password is required. The email function setting screen which is displayed upon the display section 13 in this manner is shown as the screen F10A in FIG. 10.

During display of the email function setting screen F10A, when a "menu" button upon the operation unit 12 is pressed, a list screen F10B is displayed of functions which can be designated by reference to this menu screen. Here, when the motion short cut B is selected, a screen F10C for the motion short cut B is displayed. When, during display of this screen F10C, the user actuates the operation unit 12 in order to register the short cut, and selects "1. Register", then a selection screen F10D is displayed for selection of the number under which to register the motion short cut.

On the other hand, if during the display of the screen F10C "2. Cancel" is selected, then a screen F10F for selection of the number of the already registered motion short cut which is to be canceled is displayed. When, upon this screen, a motion short cut which is already registered is selected, then this registration is canceled, and the operation of the motion short cut B function unit 65 is terminated.

When "2. Not Registered" is selected on the screen F10D, then a screen F10E is displayed. Simultaneously with the transition to this screen F10E, the sensors of the sensor unit 23 start performing their observations. And the movement parameter calculation unit 34 starts the acquisition of the values from the sensor unit 23 which have been observed, and the calculation of the movement parameters based upon the results of this acquisition. At this stage, the user imparts a movement to the cellular phone 20 for taking advantage of the short cut function. A combination of rotations and translations such as shown in FIG. 11 is an example of such a movement.

Figure 12A:
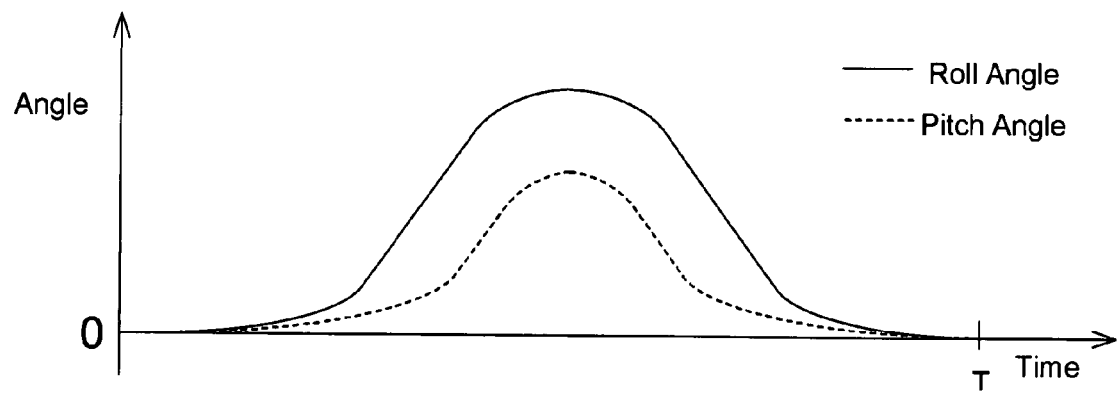
FIG. 12A is a graph showing the change with time of certain movement parameters which have been calculated from the movement of FIG. 11 and registered.
Figure 12B:
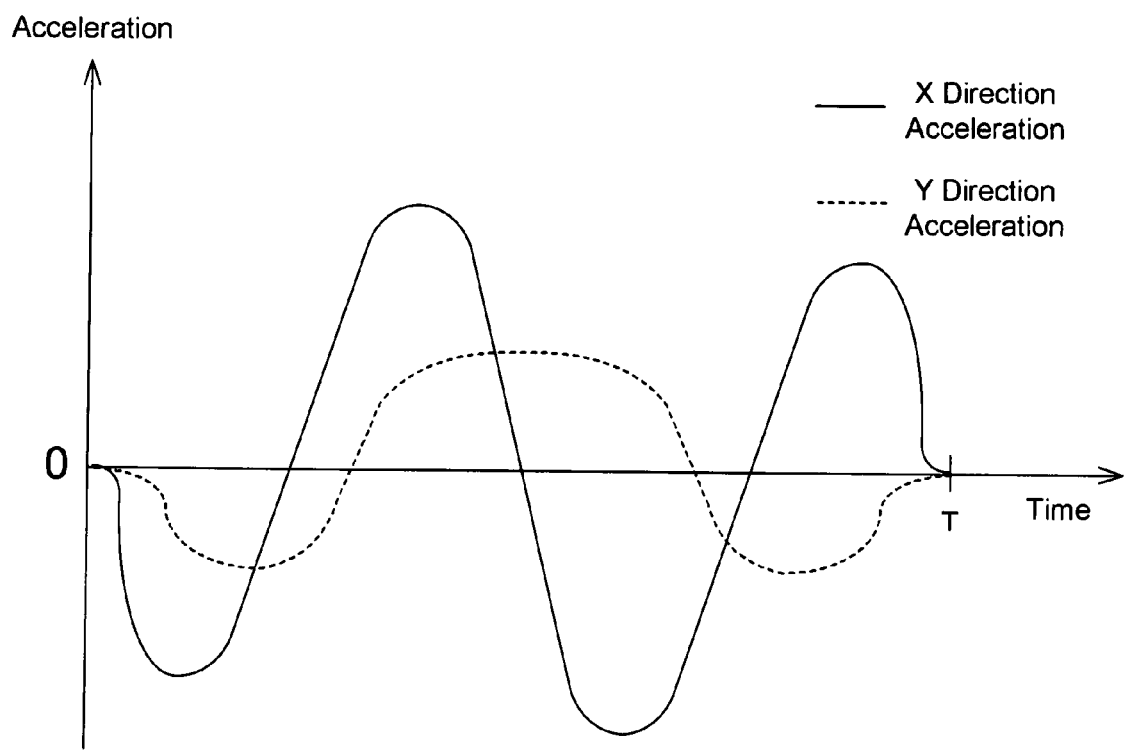
FIG. 12B is a graph showing the change with time of certain movement parameters which have been calculated from the movement of FIG. 11 and registered.

During this movement of the cellular phone 20, the various sensors of the sensor unit 23 observe the accelerations along the X and the Y axes, and the values of the magnetic fields in the X, Y, and Z directions. Next, these values are acquired by the movement parameter calculation unit 34, and the roll angle, pitch angle, X direction acceleration, and Y direction acceleration, which are movement parameters based upon these values, are calculated. The changes of these movement parameters which have been calculated in this manner are shown in FIGS. 12A and 12B. These movement parameters are notified to the motion short cut B function unit 65, and are registered as Registered Movement #2.

The operation of each of the sensors of the sensor unit 23 is terminated by operation of the operation unit 12 by the user, or two seconds after the start of observation. When the flow of observed values from the sensor unit 23 ceases, the movement parameter calculation unit 34 terminates the acquisition of observed values and the calculation of the movement parameters; and, when the calculation of the movement parameters has terminated, the registration of movement parameters by the motion short cut B function unit 65 also terminates.

Figure 11:
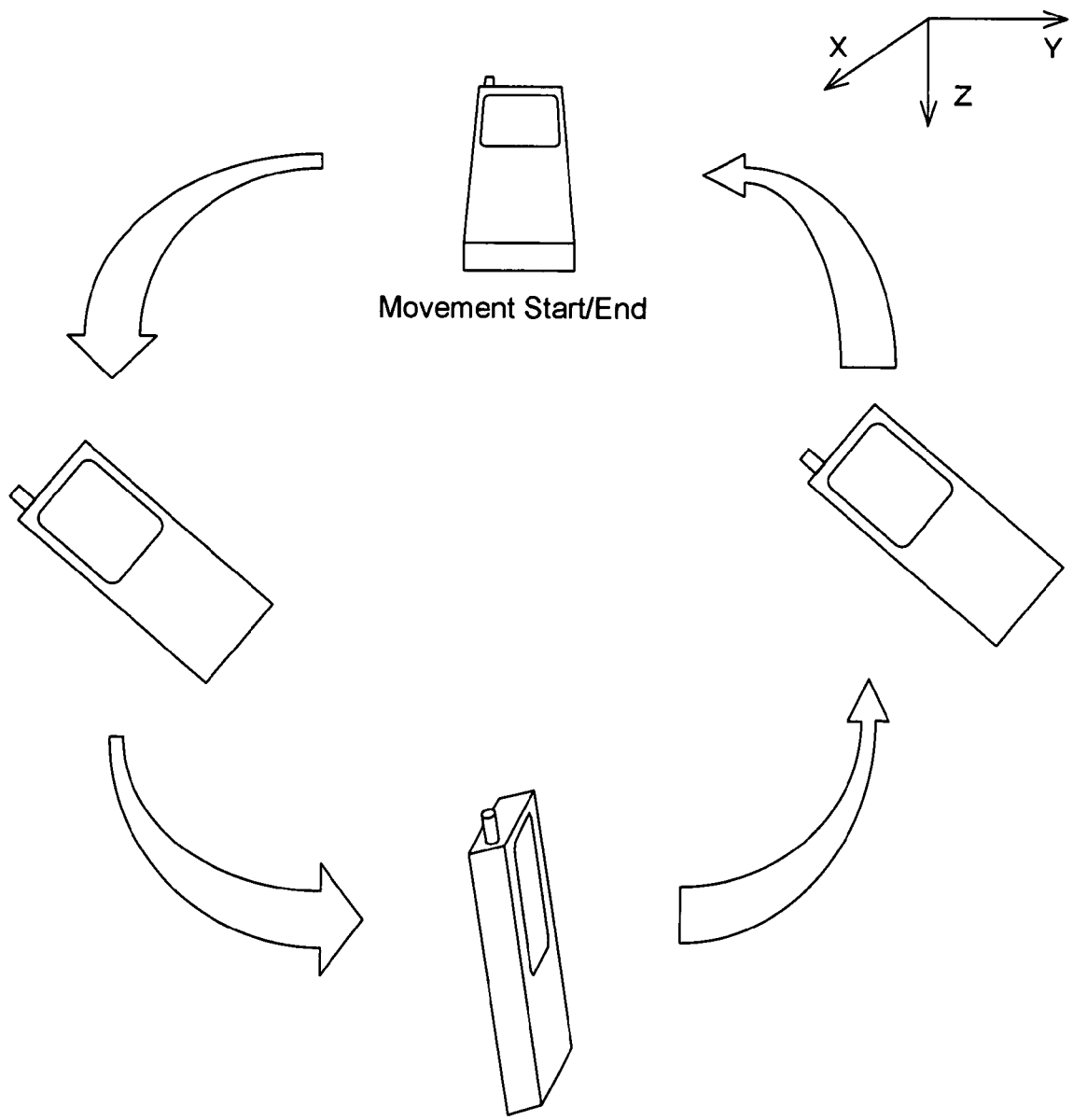
FIG. 11 is a figure showing the movements of this terminal which are registered in the motion short cut B function.

Next, when the user is to take advantage of the motion short cut B function unit 65 which has been registered, at the standby screen of the cellular phone 20, the user imparts to the cellular phone 20 the movement which has been registered as the registered movement #2; in other words, he imparts the same movement to the cellular phone 20 as shown in FIG. 11.

During this movement, in the same manner as in the previously described case of registration, the values of the accelerations in the X direction and in the Y direction, and the values of the magnetic fields in the X, Y, and Z directions, are observed by the various sensors of the sensor unit 23. And the results of these observations are acquired by the movement parameter calculation unit 34, and the roll angle, the pitch angle, the X direction acceleration, and the Y direction acceleration are calculated as the movement parameters. These movement parameters are notified to the motion short cut B function unit 65.

If, by comparing together the changes of the movement parameters which have been thus notified and FIGS. 12A and 12B by a DP matching (Dynamic Programming matching) method, the motion short cut B function unit 65 decides that this movement is the registered movement #2, then it issues a command to the function control unit 31 to display the email function setting screen. Upon receipt of this command for displaying the email function setting screen, the function control unit 31 displays the email function setting screen. And the email function setting screen of F10A is displayed upon the display section 13. On the other hand, if the motion short cut function unit 65 does not decide that this movement is any of the movements registered as motion short cuts, then it does not notify anything to the function control unit 31, and this processing terminates.

As has been explained above, in this embodiment, first, a screen is displayed upon the cellular phone 20 with no short cuts being set. And the user, along with performing actuation for starting the registration of a movement to be used as a short cut, also imparts to the cellular phone 20 the movement to be used as the short cut. And the sensor unit 23 observes the movement of the cellular phone 20, and the movement parameter calculation unit 34 calculates the movement parameters based upon the values which are thus observed. The movement parameters which are thus calculated are notified to the motion short cut B function unit 65, which registers them.

Next when, during display of the standby screen by the cellular phone 20, the user imparts a movement to the cellular phone 20, the sensor unit 23 observes this movement of the cellular phone 20, and the movement parameter calculation unit 34 calculates the movement parameters based upon these values which have been observed. The movement parameters which have thus been calculated are notified to the motion short cut B function unit 65, and are compared with the values which are registered as the motion short cut B. Here, if it is decided that this movement is the same as a movement which is registered, then a command is issued to the function control unit 31 to start the function which corresponds to the movement which has thus been decided upon, and the function control unit 31 starts the function which has been notified.

Accordingly since, in this second embodiment, the movement of the cellular phone 20 and the function which is to be employed are set by the user actually moving the cellular phone 20, therefore it is possible to set the state in which the predetermined function can be utilized, with a simple and easily remembered actuation which is set by the user. Furthermore, by taking the movement parameters as being accelerations and attitude angles, it is possible to ascertain the state of movement in an accurate manner. Moreover, even in the case of a function for which the registered function has been security protected by making input of a password necessary, it is possible to set the state in which it can be utilized, without any actuation of the operation unit, and with a simple and easily remembered actuation which is set by the user. Moreover, since change of the movement parameters which are registered in the cellular phone 20 is set by the user himself imparting movement to the cellular phone 20, accordingly they reflect the individual characteristics of the user. Due to this, it is possible to utilize them as a short cut for a function for which security is demanded.

It should be understood that, in this second embodiment, it is arranged to perform a short cut transition to a screen display of a function which has been security protected by making it necessary to perform some operation which includes the input of a password. By contrast, it would also be acceptable to arrange to make a short cut transition to a screen display for a function which is displayed by an actuation in which password input is not included.

Furthermore although, in this second embodiment, it was arranged for the destination of the transition by the motion short cut B function to be an email function setting screen for the email function, of course it would also be acceptable to arrange for the destination of the transition by the motion short cut B function to be some screen other than one for the email function.

Furthermore although, in this second embodiment, it was arranged to employ the motion short cut B function without operating any key from the standby screen, it would also be acceptable to arrange to start the use of the motion short cut B function by performing some key actuation.

Furthermore although, in this second embodiment, it was arranged for the user to register settings by moving the cellular phone 20 freely, it would also be acceptable to register settings by movements which are limited to being in the upwards, downwards, leftwards, and rightwards directions, or the like.

Furthermore although, in this second embodiment, the time period over which the movement of the cellular phone 20 was registered was taken as being 2 seconds, of course some time period other than 2 seconds would also be acceptable.

Furthermore although, in the first and second embodiments, the sensors which were used in the sensor unit were two accelerometers in the X axis direction and in the Y axis direction, and magnetometers in the X axis direction, the Y axis direction, and the Z axis direction, of course it would also be acceptable to arrange to calculate these movement parameters by using other sensors.

Furthermore although, in the first and second embodiments, the movement parameters which were calculated were accelerations and attitude angles, of course it would also be acceptable to arrange to calculate other movement parameters.

Furthermore although, in the first and second embodiments, this terminal device was applied as a cellular phone, of course it would also be possible to apply it to a terminal device other than a cellular phone.

As has been explained above, the function control method of the present invention can be applied to function control for a terminal device. Furthermore, the terminal device of the present invention can primarily be applied to a mobile communication terminal device.

What is claimed is:

1. A function control method for controlling the function of a terminal device, comprising:
   a movement parameter calculation process of calculating the value of a movement parameter of said terminal device, based upon a value detected by a sensor which detects a state of movement of said terminal device, wherein values of accelerations in the X direction and the Y direction, and values of magnetic fields in the X, Y and Z directions are detected by the sensor and a roll angle, a pitch angle, an X direction acceleration and a Y direction acceleration are calculated using the values detected;
   a movement parameter decision process of deciding whether or not the value of the movement parameter calculated by said movement parameter calculation process corresponds to an allocated motion shortcut, wherein Dynamic Programming Matching is carried out to determine if the value of the movement parameter corresponds to the allocated motion shortcut; and
   a function setting process of, if an affirmative decision is reached in said movement parameter decision process, setting a predetermined function which corresponds to said allocated motion shortcut to a state in which it can be utilized.

2. A function control method as described in claim 1, characterized in that said movement parameter is parameters including an acceleration and an attitude angle of said terminal device.

3. A function control method as described in claim 1, characterized in that said motion shortcut is determined by combining at least one movement with another movement which are determined in advance.

4. A function control method as described in claim 1, characterized in that said predetermined function is a function which can be set to a state in which it can be used, by command input from an operation unit of said terminal device.

5. A function control method as described in claim 4, characterized in that a command input for releasing security is included in the command input from said operation unit.

6. A terminal device, comprising:
   a sensor unit which acquires information necessary for calculating the value of a movement parameter;
   a movement parameter calculation unit which calculates a value of the movement parameter from the value detected by said sensor unit;
   a movement parameter decision unit which decides whether or not the value of said movement parameter which has been calculated corresponds to an allocate d motion shortcut; and
   a function control unit which, if an affirmative decision is reached by said movement parameter decision unit, sets a predetermined function which corresponds to said allocated motion shortcut to a state in which it can be utilized, wherein
   values of accelerations in the X direction and the Y direction, and values of magnetic fields in the X, Y and Z directions are detected by the sensor unit and a roll angle, a pitch angle, an X direction acceleration and a Y direction acceleration are calculated by the movement parameter calculation unit using the values detected; and
   Dynamic Programming Matching is carried out to determine if the value of the movement parameter corresponds to said allocated motion shortcut.

7. A terminal device as described in claim 6, characterized by further comprising an operation unit, and in that said predetermined function is set to a state in which it can be used, by command input from said operation unit.

8. A terminal device as described in claim 6, characterized by further comprising a wireless communication unit for communicating with a base station of a mobile communication net.

* * * * *